US009111198B2

(12) United States Patent
Oyama et al.

(10) Patent No.: US 9,111,198 B2
(45) Date of Patent: Aug. 18, 2015

(54) PRINT CONTROL METHOD, PRINT CONTROL DEVICE, AND STORAGE MEDIUM

(71) Applicant: Seiko Epson Corporation, Tokyo (JP)

(72) Inventors: Hitoshi Oyama, Nagano-ken (JP); Akio Takamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 14/204,452

(22) Filed: Mar. 11, 2014

(65) Prior Publication Data

US 2014/0285844 A1 Sep. 25, 2014

(30) Foreign Application Priority Data

Mar. 21, 2013 (JP) ................................. 2013-057746

(51) Int. Cl.
*G06K 15/02* (2006.01)

(52) U.S. Cl.
CPC .................................. *G06K 15/1806* (2013.01)

(58) Field of Classification Search
USPC .......................................... 358/412, 1.15, 1.5
See application file for complete search history.

(56) References Cited

U.S. PATENT DOCUMENTS

| 5,678,059 A | 10/1997 | Ramaswamy et al. |
| 2012/0057184 A1 | 3/2012 | Furuhata et al. |
| 2013/0314727 A1 | 11/2013 | Furuhata et al. |

FOREIGN PATENT DOCUMENTS

| CN | 104063189 | * 9/2014 | .......... G06F 15/1806 |
| JP | 08-069427 | 3/1996 | |
| JP | 2006-338443 | 12/2006 | |
| JP | 2012-058810 | 3/2012 | |

* cited by examiner

*Primary Examiner* — Jerome Grant, II

(57) ABSTRACT

A print control method executes a process of adding a command to print data output from an application to a communication port in a computer having a communication port and executing a specific process by an application installed on an application layer and operating under an operating system on the OS kernel layer, the method including: the computer acquiring the print data at the OS kernel layer before the print data is received by the communication port; determining on the application layer if each command of the acquired print data is a print instruction command for an object that should be printed at a different print speed than the standard speed; and adding and outputting to the communication port a command that changes the print speed before the print instruction command when the command is determined to be a print instruction command for printing an object at a different speed.

11 Claims, 3 Drawing Sheets

| COMMAND TYPE | COMMAND FEATURE | PRINT MODE/SPEED PARAMETER |
|---|---|---|
| LINEAR CODE (A) PRINT INSTRUCTION COMMAND | ········ | PRINT MODE (1)/1.5 |
| LINEAR CODE (B) PRINT INSTRUCTION COMMAND | ········ | PRINT MODE (2)/2.0 |
| 2D CODE (A) PRINT INSTRUCTION COMMAND | ········ | PRINT MODE (3)/3.5 |
| 2D CODE (B) PRINT INSTRUCTION COMMAND | ········ | PRINT MODE (4)/4.0 |

PRINT CONTROL METHOD, PRINT CONTROL DEVICE, AND STORAGE MEDIUM

Priority is claimed under 35 U.S.C. §119 to Japanese Application nos. 2013-057746 filed on March 21, which is hereby incorporated by reference in their entirety.

BACKGROUND

1. Technical Field

The present disclosure relates to a print control method for a host device of a printer, and relates more particularly to a print control method that enables controlling the print speed to assure the desired print quality without changing existing applications or drivers.

2. Related Art

In POS systems used in supermarkets and other retail businesses, multiple terminal devices (registers) connected over a network to a server operate and run different processes according to applications locally installed on each terminal. A printer is typically connected to each terminal device (POS terminal), and produces receipts and coupons as instructed by the application. Systems that are configured similarly to a POS system and similarly produce printouts are used in hospitals and package delivery companies.

Advances in technology and the desire to improve business operations after such systems are deployed often create a need to modify and improve the system. However, because the system is central to business operation and typically constantly in use, and is often connected to other systems in complex ways, upgrading applications is normally not simple.

Attempts to solve this problem as it relates to output process functions including the following.

JP-A-8-69427 discloses a device that executes the functions of a modem in a personal computer in which the microprocessor and memory required by a conventional modem can be eliminated without needing to modify existing application programs.

JP-A-2006-338443 discloses a device that by accessing a single communication port can print simultaneously from a printer connected to another communication port and thereby enable duplicate printing without modifying the applications.

Because of how linear codes such as barcodes and two-dimensional code symbols that are printed on receipts, for example, are used, high print quality is important and may require printing at a slower print speed than when printing other objects. Even when control enabling changing the print speed is possible in the printer used to print such print objects, if the print data sent from the host device does not contain a command to change the print speed when printing such an object, the printer may not recognize that a print object requires changing the print speed, and may print the object at the normal print speed.

A system upgrade that resolves this problem preferably enables modifying the POS system or similar system without changing existing applications.

This problem cannot be solved by the methods disclosed in JP-A-8-69427 and JP-A-2006-338443. A further problem with processes handled at the operating system kernel layer as described in JP-A-2006-338443 is that creating functions (program development) at the kernel layer is not simple and functions are limited.

SUMMARY

A print control method for a host device of a printer according to the present disclosure enables easily controlling the print speed to assure desirable print quality without changing existing applications or drivers.

One aspect of the disclosure is a print control method that executes a process of adding a command to print data output from an application to a communication port in a computer having a communication port and executing a specific process by an application installed on an application layer and operating under an operating system on the operating system kernel layer, whereby the computer executes steps including: a data acquisition step of acquiring the print data at the OS kernel layer before the print data is received by the communication port; a data interpreting step of determining on the application layer if each command of the print data acquired in the data acquisition step is a first command instructing printing a print object that should be printed at a different print speed than the standard speed; and a data processing step of executing on the application layer a command addition process of adding a command changing the print speed before the first command when the command interpreted in the data interpreting step is determined to be a first command, and not adding a command when the command is not a first command, and then outputting the processed print data to the communication port.

Preferably, the data processing step includes adding a command that returns the print speed to the standard speed after the first command when the command is a first command.

Further preferably, when the print speed can be changed to two or more speeds different from the standard speed, the command added when a first command is detected is a command changing to a print speed appropriate to the print object instructed to be printed by the first command.

Further preferably in another aspect of the disclosure, the first command is a command instructing printing a code expressing text or numeric information as a graphic pattern.

Yet further preferably in another aspect of the disclosure, the code is a linear code or a two-dimensional code.

Another aspect of the disclosure is a print control device that executes a process of adding a command to print data output from an application to a communication port in a computer having a communication port and executing a specific process by an application installed on an application layer and operating under an operating system on the operating system kernel layer, including: a data acquisition unit that acquires the print data at the OS kernel layer before the print data is received by the communication port; a data interpreting unit that determines on the application layer if each command of the acquired print data is a first command instructing printing a print object that should be printed at a different print speed than the standard speed; and a data processing unit that executes on the application layer a command addition process of adding a command changing the print speed before the first command when the command interpreted in the data interpreting step is determined to be a first command, and not adding a command when the command is not a first command, and then outputting the processed print data to the communication port.

Another aspect of the disclosure is a computer-readable storage medium storing a program causing a computer to execute the steps in the print control method described above.

Other objects and attainments together with a fuller understanding of the disclosure will become apparent and appreciated by referring to the following description and claims taken in conjunction with the accompanying drawings.

DESCRIPTION OF EMBODIMENTS

Figures 1, 2:
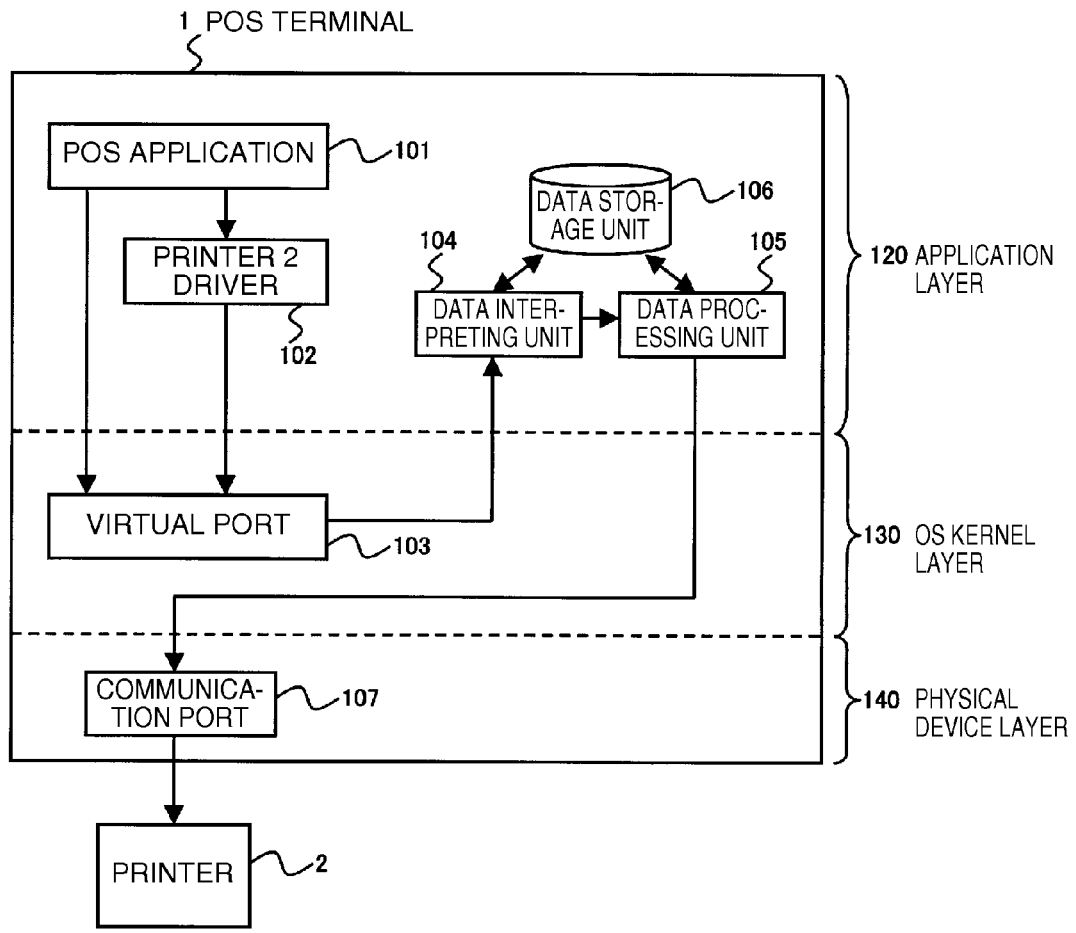
FIG. 1 is a block diagram showing the functions of a POS terminal device using the disclosure.
FIG. 2 shows an example of data stored in the data storage unit 106 shown in FIG. 1.

Preferred embodiments of the present disclosure are described below with reference to the accompanying figures. The following embodiments do not, however, limit the technical scope of the disclosure as described in the accompanying claims. Note, further, that identical or functionally similar parts are identified by the same reference numerals or reference symbols in the figures.

FIG. 1 is a function diagram of a preferred embodiment of a POS terminal according to the disclosure. The POS terminal 1 shown in FIG. 1 is an example of a device applying the disclosure, and this device acquires print data output from a POS application 101 through the virtual port 103 (data acquisition unit) on the OS kernel layer 130. The acquired data is then received by the data interpreting unit 104 on the application layer 120, the commands contained in the print data are interpreted, and whether changing the print speed (from the standard speed) is required is determined. Based on the result of this decision, the data processing unit 105 on the same application layer 120 executes a process of adding or not adding a speed control command to the print data, and outputs the print data resulting from this process through the communication port 107 to the printer 2. By executing this process, the POS terminal 1 can control the print speed of the printer 2 appropriately to print objects that require printing at high quality without changing the POS application 101 or the printer 2 driver 102.

This embodiment anticipates a POS system used in a supermarket, for example, and the POS terminal 1 shown in FIG. 1 is connected to a POS server not shown through a network. The POS server is a computer system, and tabulates, processes, and otherwise manages data acquired from POS terminal 1 and other POS terminals managed by the server.

The POS terminal 1 (print control device) is installed as a cash register in a store, for example, and is connected to a printer 2. The printer 2 outputs receipts and coupons, for example, based on the print data output from the POS terminal 1. The POS terminal 1 therefore functions as a host device to the printer 2.

The POS terminal 1 is a computer, and includes CPU, RAM, ROM, and a hard disk storage device not shown. The POS application 101 program described below and programs for interpreting data and processing data are stored in ROM, and processes are executed by the CPU operating according to these programs.

A display, keyboard, barcode reader, and card reader are also connected to the POS terminal 1. Based on information acquired from the keyboard, barcode reader, and card reader, the POS terminal 1 generates information to be printed on a receipt or coupon, and outputs to the printer 2.

The functional configuration of the POS terminal 1 is shown in FIG. 1. The POS application 101 runs a process that generates and outputs information for printing a receipt or coupon. The generated data is data in a form enabling output directly to the printer 2, or data in a form that is passed to the printer 2 driver 102. The former format is produced for printing text and other simple print data.

The printer 2 driver 102 is a printer driver for the printer 2, and outputs data output from the POS application 101 as print data that can be received and printed by the printer 2 using commands dependent on the model of printer 2 (specific device).

The output print data comprises commands instructing printer 2 operations, and data strings representing the content of the print object are contained in print instruction commands for each print object. For example, when the print object is a code representing alphanumeric information as a graphic pattern, such as a linear or 2D barcode, data strings representing an image of the graphic pattern is contained in the commands.

As shown in FIG. 1, the POS application 101 and printer 2 driver 102 are both on the application layer 120 where programs execute processes based on the operating system (OS) of the computer. Both the POS application 101 and printer 2 driver 102 are rendered by a CPU executing processes according to programs stored in ROM that control the content of the processes, for example.

The virtual port 103 is where print data output from the POS application 101 or the printer 2 driver 102 is received at the OS kernel layer 130 of the operating system before being received by the communication port 107. The virtual port 103 then passes the received print data to the data interpreting unit 104.

The data interpreting unit 104 interprets the received print data, and determines if the commands contained in the print data include a command (first command) instructing printing a print object requiring printing at a print speed different from the standard print speed, or more specifically, a print object requiring speed control.

Based on the result from the data interpreting unit 104, the data processing unit 105 executes a process that adds a speed control command to the commands. More specifically, if the decision is that there is a command instructing printing a print object requiring speed control, the data processing unit 105 adds a speed control command setting a print speed appropriate to the print object, and a speed control command resetting (returning to) the standard print speed, respectively before and after the print object requiring speed control. However, if the decision is that a command instructing printing a print object requiring speed control is not contained, the data processing unit 105 outputs the data directly to the communication port 107 without adding other commands. Note that a single speed control command can be defined as the command controlling the print speed, and the actual print speed can be set using a parameter of the command.

The data storage unit 106 stores data used by the data interpreting unit 104 and data processing unit 105. The data storage unit 106 stores data for determining what print objects are contained in received commands, and data for added commands.

FIG. 2 shows an example of data stored in the data storage unit 106. FIG. 2 shows features of the print instruction commands for linear codes and 2D codes that should be printed at different print speeds, and the print mode or speed parameter suited to printing by each command.

Column A in FIG. 2 shows four print instruction commands for two different linear codes and two different 2D codes, and column B in FIG. 2 shows features of the data string stored in each command for recognizing that command. Column C in FIG. 2 shows information related to the print speed used when executing each command. Information about the print modes (print modes (1) to (4) in this example) of the printer 2, or the value of the speed parameter that should be set in the speed control command described above, are shown in column C. Note that print modes (1) to (4) each have a different print speed.

Note that the virtual port 103, data interpreting unit 104, and data processing unit 105 are each rendered by a program instructing the processes performed by each part, and a CPU and other hardware that execute the processes according to the program. The data storage unit 106 is a hard disk drive in this embodiment.

The communication port 107 is disposed to the physical device layer 140 in the POS terminal 1, and connects to the printer 2. The communication port 107 could be a serial COM communication port or a USB communication port, for example. The printer 2 in this example is an inkjet color printer, executes the printing process at a standard print speed by default, and can change the print speed based on a speed control command. Note that this embodiment shows a single communication port 107 and a single printer 2 connected to the POS terminal 1, but the number of communication ports 107 and plural printers 2 is not so limited.

Figure 3:
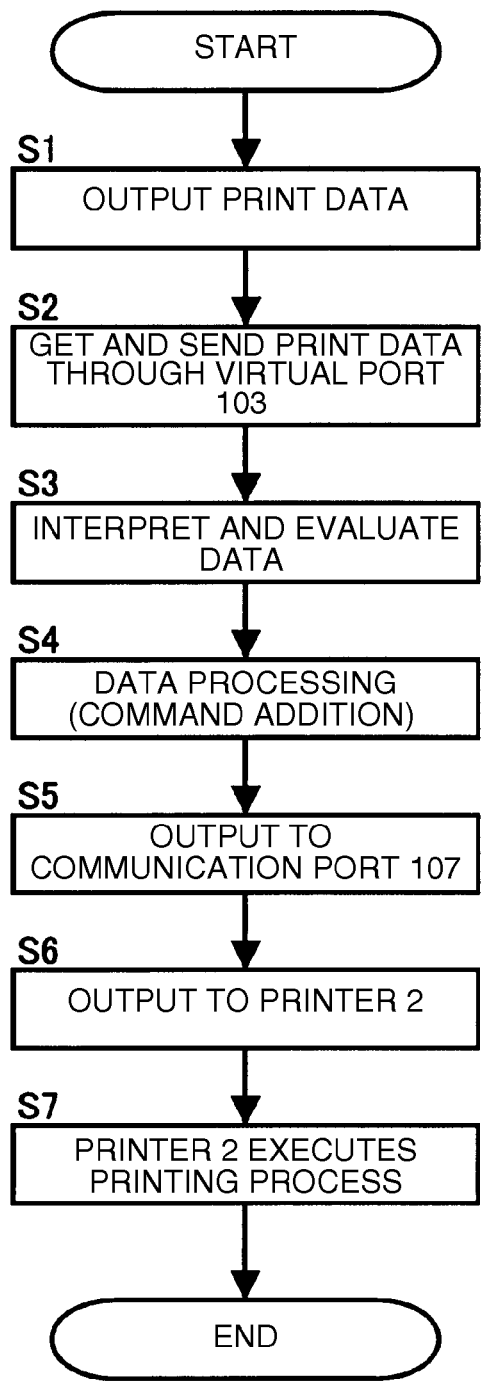
FIG. 3 is a flow chart of the printing process.

The POS terminal 1 configured as described above executes a process with steps such as described below when printing. FIG. 3 is a flow chart showing an example of the process executed when printing. As described above, print data is output directly from the POS application 101 or through the printer 2 driver 102 (step S1 in FIG. 3). This example anticipates that the print data is print data for a receipt to be produced and output by the printer 2, and is written with commands appropriate to the printer 2.

The output print data is first received by the virtual port 103 before reaching the communication port 107 (step S2 in FIG. 3). This process is achieved by changing the (priority) setting of the registry so that data for the communication port 107 is first received by the virtual port 103, and this registry change is made when the operating system starts up. The received print data is then sent from the virtual port 103 to the data interpreting unit 104 on the application layer 120 (step S2 in FIG. 3).

The data interpreting unit 104 interprets the transmitted print data, and determines if print speed control as described above is required (step S3 in FIG. 3). More specifically, the data interpreting unit 104 sequentially interprets the command contained in the print data sent from the virtual port 103, and determines if the command is a print instruction command for a print object that should be printed at a different print speed than the standard speed. Yet more specifically, the data interpreting unit 104 references data such as shown in FIG. 2 and stored in the data storage unit 106, and compares the feature content (column B in FIG. 2) of each command stored in the table with the data in the target command being evaluated. Whether the command is a print instruction command stored in the data storage unit 106, that is, whether the command is a print instruction command for a print object that should be printed at a different print speed than the standard speed, is determined from the identity of the commands.

For example, if the printout is a receipt and there is a print instruction command for a barcode to be printed on the receipt, this command feature matches the print instruction command for a linear code (A) as shown in FIG. 2, and should be printed at a different print speed than the standard speed.

A match will not be found for print instruction commands for text and commands that are not print instructions, and such commands are not determined to be print instruction commands for print objects that should be printed at a different print speed than the standard speed.

The data interpreting unit 104 then passes the result of this decision and the command data that was evaluated sequentially to the data processing unit 105, and the data processing unit 105 sequentially applies a step of command addition to the data for each command (step S4 in FIG. 3). More specifically, if the decision is that the command is a print instruction command for a print object that should be printed at a different print speed than the standard speed, the data processing unit 105 adds a speed control command that sets a print speed suited to the print object instructed to be printed by that command immediately before the command data, and adds a speed control command that resets (returns) the standard print speed immediately after the command data.

The data processing unit 105 produces the speed control command that sets a print speed appropriate to the print object by getting the value of the speed parameter (column C in FIG. 2) stored in the data storage unit 106 for the type (column A in FIG. 2) of the command recognized during evaluation by the data interpreting unit 104, and setting this value in the speed control command. For example, if the data interpreting unit 104 recognizes the target command as a print instruction command for printing a barcode, the data processing unit 105 gets the command type information from the data interpreting unit 104, accesses the data storage unit 106, and retrieves the speed parameter (1.5 in the example shown in FIG. 2) stored for that command type. The data processing unit 105 then sets that value in the speed control command to produce the command that is added.

If the decision described above is that the command is not a print instruction command for a print object that should be printed at a different print speed than the standard speed, the foregoing step of adding commands is skipped. More specifically, the received command is passed directly without further processing.

When this step of adding or not adding commands is completed, the data processing unit 105 sequentially outputs the processed data (print data) to the communication port 107 (step S5 in FIG. 3).

The output print data is then appropriately sent to the printer 2 (step S6 in FIG. 3), and the print data is received by the printer 2.

The printer 2 executes a printing process according to the received print data, and the printout is output (step S7 in FIG. 3). Because print instruction commands to which commands were added in the command addition step are executed in the printing process after first executing the speed control command added before the print instruction command, and the print speed is therefore changed appropriately to the print object printed next, the print object can be printed with good print quality. More specifically, barcodes and other graphic patterns can be printed at a slower speed than the standard speed, and high print quality is assured. Furthermore, because a command that resets the standard print speed is executed after the print object is printed, printing the following content at higher quality than needed is prevented.

The printing process of the POS terminal 1 thus ends.

In a POS terminal 1 according to this embodiment of the disclosure, commands are added to the print data output from the POS application 101, and linear codes and 2D codes can be printed with high print quality. A POS terminal device that is not configured to execute this command addition step can also be upgraded to a POS terminal 1 according to the disclosure by a relatively simple method.

Figure 4:
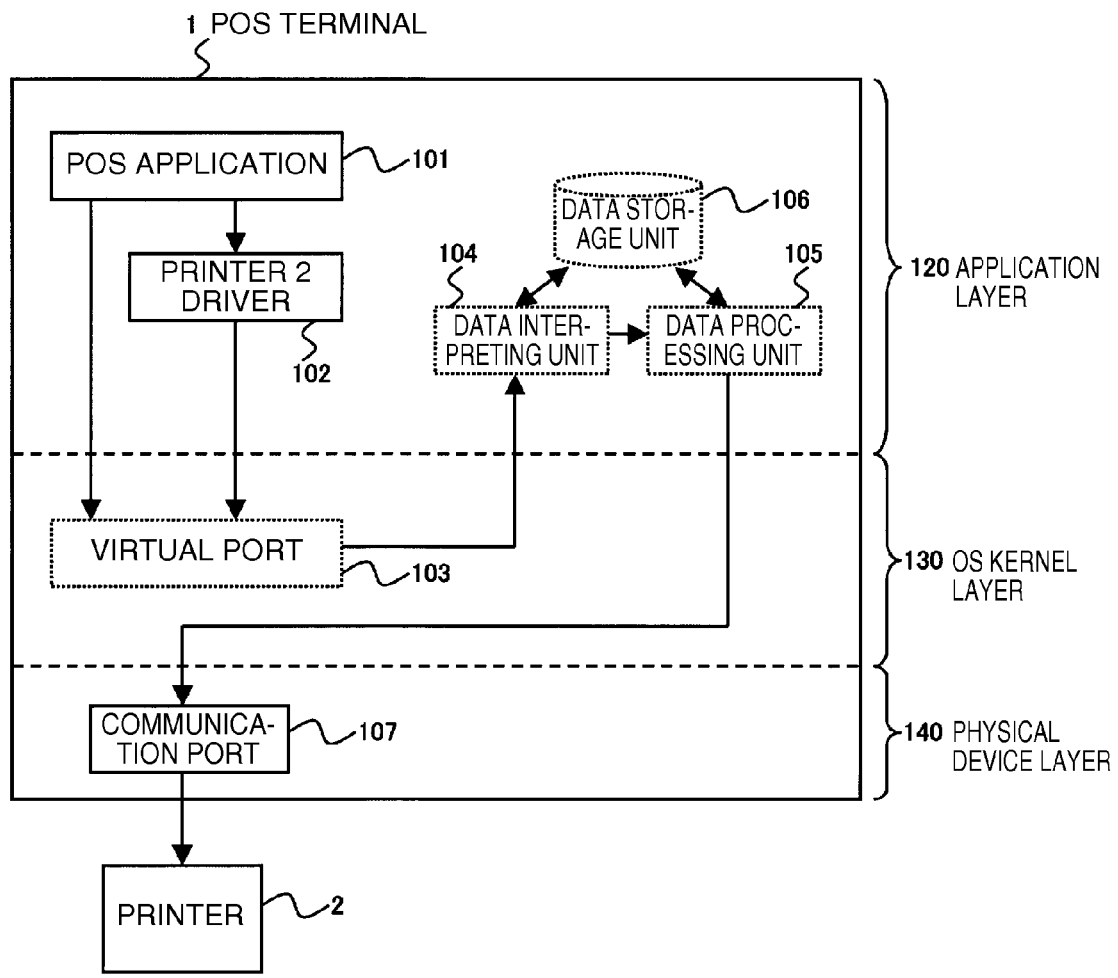
FIG. 4 describes a system improvement.

FIG. 4 describes an example of such an upgrade. This figure differs from the function block diagram shown in FIG. 1 in that the blocks denoted by solid lines indicate a POS terminal device that does not add commands as described above. More specifically, before being upgraded the communication port 107 of the POS terminal receives print data output directly from the POS application 101 or the printer 2 driver 102, and outputs to the printer 2. The POS terminal thus configured can be upgraded to the POS terminal 1 according to the disclosure by adding the parts indicated by the dotted lines.

More specifically, an existing POS terminal can be upgraded without changing the existing POS application 101 and printer 2 driver 102 by adding a virtual port 103, data interpreting unit 104, data processing unit 105, and data storage unit 106. This upgrade (addition) can be accomplished by simply installing a new program and data.

Using the print control method according to this embodiment of the disclosure, the print speed can be controlled command by command, and barcodes and other code symbols printed as graphic patterns can be printed with high quality by means of a simple method that does not involve changing the existing POS application program and printer driver program. Furthermore, because the data interpreting and command addition steps are executed on the application layer of the computer, development of the program is also simple.

Print quality appropriate to the print object can also be assured because plural speeds corresponding to different types of print objects can be set.

The speed control command added by the data processing unit 105 is described as a command generated by setting a speed parameter above, but could be a command that sets a particular print mode of the printer 2. In this event, data such as shown in FIG. 2 is referenced, the print mode corresponding to the recognized command type is selected, and the speed control command (set print mode command) is generated. The printer 2 then changes the print mode according to the command. After the print instruction command is then executed, the original print mode is restored by a command that resets the standard print mode and is added directly after the print instruction command.

The foregoing embodiment describes an example in which the POS terminal 1 and the printer 2 are connected, but the disclosure is not so limited and the disclosure can be used in an environment in which the printer and a host device are connected.

The foregoing embodiment uses a POS system as an example, but the disclosure is not limited to use in POS systems, can be used in systems used in hospitals, package delivery companies, and other systems running a specific application that includes producing printouts from a printer, and is particularly effective when upgrading an existing application program is difficult.

The foregoing embodiment describes storing programs including the POS application program and a program for adding commands in ROM, but the programs can obviously be alternatively stored in RAM, a hard disk drive, or other desirable storage medium. The programs could also be stored on different storage media.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A print control method that executes a process of adding a command to print data output from an application to a communication port in a computer having a communication port and executing a specific process by an application installed on an application layer and operating under an operating system on the operating system kernel layer, whereby the computer executes steps including:

a data acquisition step of acquiring the print data at the OS kernel layer before the print data is received by the communication port;

a data interpreting step of determining on the application layer if each command of the print data acquired in the data acquisition step is a first command instructing printing a print object that should be printed at a different print speed than the standard speed; and a data processing step of executing on the application layer a command addition process of adding a command changing the print speed before the first command when the command interpreted in the data interpreting step is determined to be a first command, and not adding a command when the command is not a first command, and then outputting the processed print data to the communication port.

2. The print control method described in claim 1, wherein: the data processing step includes adding a command that returns the print speed to the standard speed after the first command when the command is a first command.

3. The print control method described in claim 1, wherein: when the print speed can be changed to two or more speeds different from the standard speed, the command added when a first command is detected is a command changing to a print speed appropriate to the print object instructed to be printed by the first command.

4. The print control method described in claim 1, wherein: the first command is a command instructing printing a code expressing text or numeric information as a graphic pattern.

5. The print control method described in claim 4, wherein: the code is a linear code or a two-dimensional code.

6. A non-transitory computer-readable storage medium storing a program causing a computer to execute the steps in the print control method described in claim 1.

7. A print control device that executes a process of adding a command to print data output from an application to a communication port in a computer having a communication port and executing a specific process by an application installed on an application layer and operating under an operating system on the operating system kernel layer, comprising:

a data acquisition unit that acquires the print data at the OS kernel layer before the print data is received by the communication port;

a data interpreting unit that determines on the application layer if each command of the acquired print data is a first command instructing printing a print object that should be printed at a different print speed than the standard speed; and a data processing unit that executes on the application layer a command addition process of adding a command changing the print speed before the first command when the command interpreted in the data interpreting step is determined to be a first command, and not adding a command when the command is not a first command, and then outputting the processed print data to the communication port.

8. The print control device described in claim 7, wherein: the data processing unit adds a command that returns the print speed to the standard speed after the first command when the data interpreting unit determines the command is a first command.

9. The print control device described in claim 7, wherein: when the print speed can be changed to two or more speeds different from the standard speed, the command added when a first command is detected is a command changing to a print speed appropriate to the print object instructed to be printed by the first command.

10. The print control device described in claim 7, wherein:
the first command is a command instructing printing a code expressing text or numeric information as a graphic pattern.

11. The print control device described in claim 10, wherein:
the code is a linear code or a two-dimensional code.

* * * * *